United States Patent
Jeon et al.

(10) Patent No.: US 9,544,389 B2
(45) Date of Patent: Jan. 10, 2017

(54) METHOD AND DEVICE FOR PROCESSING SERVICE IN SOFTWARE-DEFINED NETWORKING SYSTEM

(71) Applicant: Samsung Electronics Co., Ltd., Gyeonggi-do (KR)

(72) Inventors: Young-Ki Jeon, Gyeonggi-do (KR); Seong-Ryong Kang, Gyeonggi-do (KR); Woo-Jae Kim, Gyeonggi-do (KR); Jong-Hyune Kim, Seoul (KR); Jung-Ah Choi, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 174 days.

(21) Appl. No.: 14/279,201

(22) Filed: May 15, 2014

(65) Prior Publication Data
US 2014/0341199 A1    Nov. 20, 2014

(30) Foreign Application Priority Data

May 15, 2013   (KR) .......................... 10-2013-0055168

(51) Int. Cl.
| | |
|---|---|
| *H04W 40/02* | (2009.01) |
| *H04L 29/08* | (2006.01) |
| *H04W 4/18* | (2009.01) |
| *H04L 12/931* | (2013.01) |
| *H04L 12/715* | (2013.01) |
| *H04L 29/12* | (2006.01) |

(52) U.S. Cl.
CPC .......... *H04L 67/2842* (2013.01); *H04L 45/64* (2013.01); *H04L 49/00* (2013.01); *H04W 4/18* (2013.01); *H04W 40/02* (2013.01); *H04L 61/2007* (2013.01)

(58) Field of Classification Search
None
See application file for complete search history.

(56) References Cited

U.S. PATENT DOCUMENTS

| | | | |
|---|---|---|---|
| 8,122,098 B1 * | 2/2012 | Richardson | ......... H04L 61/1511 709/217 |
| 8,824,274 B1 * | 9/2014 | Medved | ................... H04L 41/12 370/217 |
| 9,185,584 B1 * | 11/2015 | Ramamurthy | ........ H04W 24/04 |
| 2006/0046644 A1 | 3/2006 | Chung et al. | |
| 2010/0178914 A1 | 7/2010 | Fischer et al. | |
| 2010/0202458 A1 * | 8/2010 | Sato | ........................ H04L 69/04 370/392 |

(Continued)

OTHER PUBLICATIONS

Written Opinion of the International Searching Authority in connection with PCT/KR2014/004350, Aug. 19, 2014, 6 pages.

*Primary Examiner* — Hassan Kizou
*Assistant Examiner* — Hashim Bhatti

(57) ABSTRACT

A method and device for processing a service in a mobile communication system based on SDN technology are provided. The method of controlling access caches in a communication network includes receiving information about contents requested by a user equipment (UE) connected to a first base station. The method also includes transmitting a forwarding request that requests to control at least one switch in order for an access cache that has the contents and that interworks with a second eNB to transfer the contents to the first eNB.

20 Claims, 9 Drawing Sheets

(56) References Cited

U.S. PATENT DOCUMENTS

| | | | |
|---|---|---|---|
| 2011/0261825 A1* | 10/2011 | Ichino | H04L 45/38 370/400 |
| 2011/0280173 A1* | 11/2011 | Ha | H04W 76/041 370/312 |
| 2011/0280213 A1* | 11/2011 | Calhoun | H04W 76/022 370/331 |
| 2012/0201140 A1* | 8/2012 | Suzuki | H04L 45/22 370/235 |
| 2012/0252458 A1 | 10/2012 | Ohnishi | |
| 2012/0300615 A1 | 11/2012 | Kempf et al. | |
| 2013/0013726 A1* | 1/2013 | Westberg | H04L 67/2847 709/213 |
| 2013/0024500 A1* | 1/2013 | Cao | H04L 67/2842 709/203 |
| 2013/0054761 A1 | 2/2013 | Kempf et al. | |
| 2013/0077570 A1* | 3/2013 | Lee | H04W 76/022 370/328 |
| 2014/0173018 A1* | 6/2014 | Westphal | H04L 41/0823 709/213 |
| 2014/0219179 A1* | 8/2014 | Zakrzewski | H04W 4/18 370/328 |
| 2014/0254373 A1* | 9/2014 | Varma | H04W 40/36 370/235 |
| 2014/0254481 A1* | 9/2014 | Lee | H04M 15/82 370/328 |
| 2014/0269535 A1* | 9/2014 | Pazhyannur | H04W 40/24 370/329 |

* cited by examiner

METHOD AND DEVICE FOR PROCESSING SERVICE IN SOFTWARE-DEFINED NETWORKING SYSTEM

PRIORITY

The present application is related to and claims the benefit under 35 U.S.C. §119(a) of a Korean patent application filed in the Korean Intellectual Property Office on May 15, 2013 and assigned Serial No. 10-2013-0055168, the entire disclosure of which is hereby incorporated by reference.

TECHNICAL FIELD

The present invention relates to software-defined networking (SDN) technology, and more particularly, to a method and device for processing a service in a mobile communication system based on SDN technology.

BACKGROUND

Software-Defined Networking (SDN) can be networking technology that enables a data plane to perform simple traffic forwarding and that enables a central controller to determine a transmitting location and method of traffic by separating a control plane and the data plane and concentrating a control area to a controller. Particularly, by providing various Application Programming Interfaces (APIs) through a northbound API and enabling programming using the various APIs, the controller can perform various traffic controls based on network information. An OpenFlow protocol can be a protocol that supports the SDN to operate and that transfers forwarding information between the controller and a switch and that transfers a state of the switch or traffic information to the controller.

An OpenFlow protocol to be a base of SDN technology has been already standardized in the Open Networking Foundation, and a patent has been applied in relation thereto. However, in standardization and a patent application, a method of transmitting traffic can be discussed and defined. For example, U.S. Patent Laid-Open Publication No. 2011/0261825 in which a patent can be applied to U.S. patent application Ser. No. 13/176,619 by Kiyohisa Ichino (NEC Corporation), and laid-opened with a title of an invention "OpenFlow Communication System and OpenFlow Communication Method" relates to a specification of an OpenFlow protocol. The patent application describes OpenFlow technology and generally discloses operation of OpenFlow and an operation method in a switch to which OpenFlow can be applied.

A method of using an OpenFlow protocol has been discussed. For example, U.S. Patent Laid-Open Publication No. 2012/0300615 in which a patent is applied to U.S. patent application Ser. No. 13/536,838 by four persons (Telefonaktiebolaget LM Ericsson) other than James Kempf and laid-opened with a title of an invention "Implementing EPC in a Cloud Computer with OpenFlow Data Plane" suggests a method of using OpenFlow in a Long Term Evolution (LTE) network. The patent relates to a method of embodying an Evolved Packet Core (EPC) in cloud and describes an example of applying OpenFlow to necessary technology when virtualizing the EPC.

Content caching technology provides contents in which a user equipment (UE) of a mobile communication system requests. An access cache and a core cache provide a content caching function in an eNB and a core. For contents in which a UE requests, it can be first determined whether the same content is stored at an access cache located at an eNB site, and if the same content is stored at an access cache, a corresponding content can be transferred to the UE. In this case, a method of transferring traffic may be changed according to a method of embodying the core cache and the access cache. As a method of transferring traffic, for example, byte caching technique and object caching technique may be used. Such existing content caching technology can exhibit effect only when a content in which the UE requests is stored at an access cache installed at an eNB site. When a corresponding content is not stored at an access cache interworking with an eNB to which the UE can be accessed, but when a corresponding content is stored at an access cache interworking with an adjacent eNB, there can be no method of transferring the content to the UE. Therefore, when a content in which a UE requests is not stored at an access cache interworking with an eNB to which the UE is accessed, but when a corresponding content is stored at an access cache interworking with an adjacent eNB, a method of effectively transferring the content to the UE can be requested.

SUMMARY

To address the above-discussed deficiencies, it is a primary object to provide a method and device for processing a service that effectively transfers a requested content to a UE, when a content in which a UE requests is stored at an access cache interworked with an adjacent base station instead of a base station to which the UE is accessed.

In a first example, a method of controlling access caches in a communication network includes receiving information about contents requested by a UE accessed to a first base station. The method also includes transmitting a forwarding request that requests to control at least one switch in order for an access cache that has the contents and that interworks with a second base station to transfer the contents to the first base station.

In a second example, a method of operating a controller that controls switches in a communication network includes receiving a forwarding request that requests to forward contents requested by a UE accessed to a first base station. The method also includes determining a forwarding path in order for an access cache that has the contents and that interworks with a second base station to transfer the contents to the first base station. The method further includes transmitting path information to at least one switch.

In a third example, a method of operating a switch in a communication network includes receiving path information about contents to transfer from a controller to a UE accessed to a first base station. The method also includes transmitting contents stored at an access cache interworking with a second base station to another switch interworking with the first base station.

In a fourth example, a device that controls access caches in a communication network includes a communication unit configured to receive information about contents requested by a UE accessed to a first base station and that transmits a forwarding request that requests to control at least one switch in order for an access cache that has the contents and that interworks with a second base station to transfer the contents to the first base station.

In a fifth example, a controller device configured to control switches in a communication network includes a communication unit that receives a forwarding request that requests to forward contents requested by a UE accessed to a first base station. The controller device also includes a controller configured to determine a forwarding path in order for an access cache that has the contents and that interworks with a second base station to transfer the contents to the first base station, wherein the communication unit is configured to transmit path information W to at least one switch.

In a sixth example, a switch device in a communication network includes a control unit configured to receive path information about contents to transfer from a controller to a UE accessed to a first base station and configured to control the transmission of contents stored at an access cache interworking with a second base station to another switch interworking with the first base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Exemplary embodiments of the present disclosure to be described hereinafter relate to a method of efficiently transmitting traffic at a Radio Access Network (RAN) segment by applying service chaining by transferring traffic to a specific evolved node B (eNB) using software-defined networking (SDN) technology in a Long Term Evolution (LTE) network and of using SDN/OpenFlow at an LTE RAN segment so as to improve a service performance. Particularly, exemplary embodiments disclosed herein relate to technology that can enhance a service quality of a user equipment and that can reduce a use amount of backhaul and that can enhance use of a server in an eNB by applying OpenFlow to a switch that connects an eNB to backhaul and grouping servers into a pool, when servers that provide a service exist in an eNB and by transferring traffic of the user equipment to an appropriate server.

Figure 1:
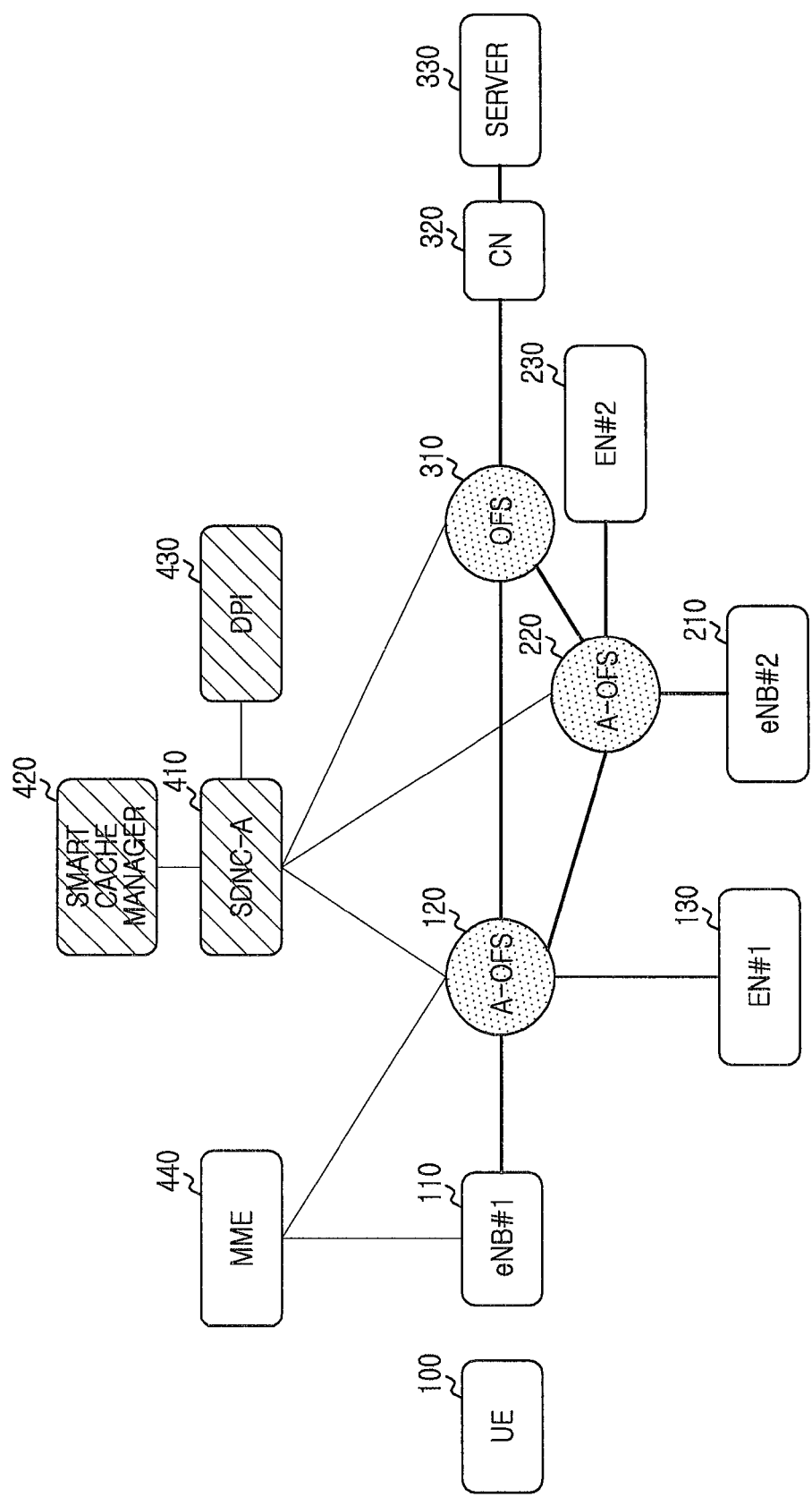
FIG. 1 is a diagram illustrating an example structure of an SDN-based mobile communication network according to this disclosure.

FIG. 1 is a diagram illustrating an example structure of an SDN-based mobile communication network according to this disclosure. A configuration shown in FIG. 1 is only an illustration, and other exemplary embodiments can be used without deviating from the scope of this disclosure.

Referring to FIG. 1, it can be assumed that the network is an LTE network in which ENs 130 as an access cache that provides a content caching function in an eNB site and a Core Network (CN) 320 as a core cache that provides a content caching function in a core exist.

An Access-OpenFlow Switch (A-OFS) 120 can be disposed between an eNB#1 110 and an access cache (EN#1) 130 to connect them, and an OpenFlow Switch (A-OFS) 220 can be disposed between an eNB#2 210 and an access cache (EN#2) 230 to connect them. An OpenFlow switch (C-OFS) 310 can interwork with a CN 320. The A-OFS 120, the A-OFS 220, and the C-OFS 310 can be connected to each other and can be controlled by an SDN controller (SDNC-A) 410. OpenFlow can be applied to the A-OFSs 120 and 220 and the C-OFS 310, and the A-OFSs 120 and 220 and the C-OFS 310 can perform an operation such as path setup based on the SDNC 410 and OpenFlow. The SDNC 410 can analyze traffic using a deep packet inspection (DPI) function unit 430, can determine a forwarding path on each switch basis, and can transfer the forwarding path to each switch so as to transfer the packet to an appropriate server.

In a configuration of a network, in order to efficiently transmit traffic, A-OFSs 120 and 220 can perform a General Packet Radios System (GPRS) Tunneling Packet (GTP) termination function. In other words, the A-OFSs 120 and 220 can perform encapsulation and decapsulation of a GTP packet. Accordingly, the A-OFSs 120 and 220 can perform a function similar to that of an existing Evolved Packet Core (EPC). Therefore, a Mobility Management Entity (MME) 440 existing at an existing core network can interwork with the A-OFSs 120 and 220. Further, the SDNC 410 can interwork with a smart cache manager 420, can acquire information about a location of a content in which a user equipment requests, and can set a path at each switch according to the information.

Functions performed by each constituent element of the network shown in FIG. 1 can be as follows.

The eNBs 110 and 210, the ENs 130 and 230, and the MME 440 can perform an existing function. Herein, the eNB 110 and 210 can be referred as a base station.

The A-OFSs 120 and 220 can perform a function such as a flow processing according to bearer setup and resource allocation of a user equipment and a Policy and Charging Control (PCC) rule. The A-OFSs 120 and 220 can perform a data plane function of the EPC, and control information such as path setup can be set based on control information transferred from the SDNC 410. An OpenFlow agent can be executed, and thus when a flow packet that is not set is received, the A-OFSs 120 and 220 can report the fact to the SDNC 410, can acquire control information of the SDNC 410, and can set a path.

The OFS (or Core-OpenFlow Switch (C-OFS)) 310 can be a switch that can process a general OpenFlow protocol, can acquire forward path setup information from the SDNC 410, and can perform path setup based on the forward path setup information.

By interworking with the smart cache manager 420, the SDNC 410 can transfer a forward path setup instruction to the A-OFSs 120 and 220 and the OFS 310 based on an OpenFlow protocol. For this, the SDNC 410 can interwork with the smart cache manager 420 using an application program interface such as a RESTful API.

By interworking with the CN 320, the smart cache manager 420 can acquire and manage content information stored at each of the ENs 130 and 230. Contents using as an object can be contents preloaded by a Content Provider (CP), and the information can be stored at the CN 320 and can be managed by the CN 320 according to an operation of the smart cache manager 410. Therefore, the smart cache manager 420 can acquire the information, actual contents and a Uniform Resource Location (URL), can manage address information of an EN in which contents are stored, can grasp an EN in which contents corresponding to an URL in which the user equipment requests are stored, and can transfer this to the SDNC 410. For such an operation, the smart cache manager 420 can include a communication unit that can provide an interface for transmitting and receiving information to and from another entity, a storage unit that can store data, and a control unit that can control an operation of the smart cache manager 420.

The DPI 430 can perform a function requiring together with a function in which a general DPI performs. For example, contents can be contents in which a CP preloads and can be a large amount of media file. That is, the DPI 430 can analyze an HTTP request message in which the user equipment requests, can determine whether a requested content is a content in which the CP preloads, and can perform a function of notifying the smart cache manager 420 of the content.

An SDN-based communication system shown in FIG. 1 can include an eNB#1 110, a first A-OFS 120 interworking with the eNB#1 110, an EN#1 130 interworking with the A-OFS 120, an eNB#2 210 adjacent to the eNB#1 110, an A-OFS 220 interworking with the eNB#2 210, and an EN#2 230 interworking with the A-OFS 120.

In an embodiment, a method of processing a service in an SDN-based communication system can include a process of determining an access cache in which contents corresponding to a packet are stored, when the packet is received from a user equipment (UE) 100 connected to the eNB#1. The method can also include a process of setting a path of the A-OFSs 120 and 220 so as to transfer the packet via the EN#2 230, when the determined access cache is the EN#2 230.

In an embodiment, a service processing device of an SDN-based communication system can include a smart cache manager 420 that can determine an access cache in which a content corresponding to the packet is stored, when the packet is received from a UE accessed to the eNB#1 130 and an SDNC 410 that can set a path of the OpenFlow switches so as to transfer the packet via the EN#2 230, when the determined access cache is the EN#2 230.

Figure 2:
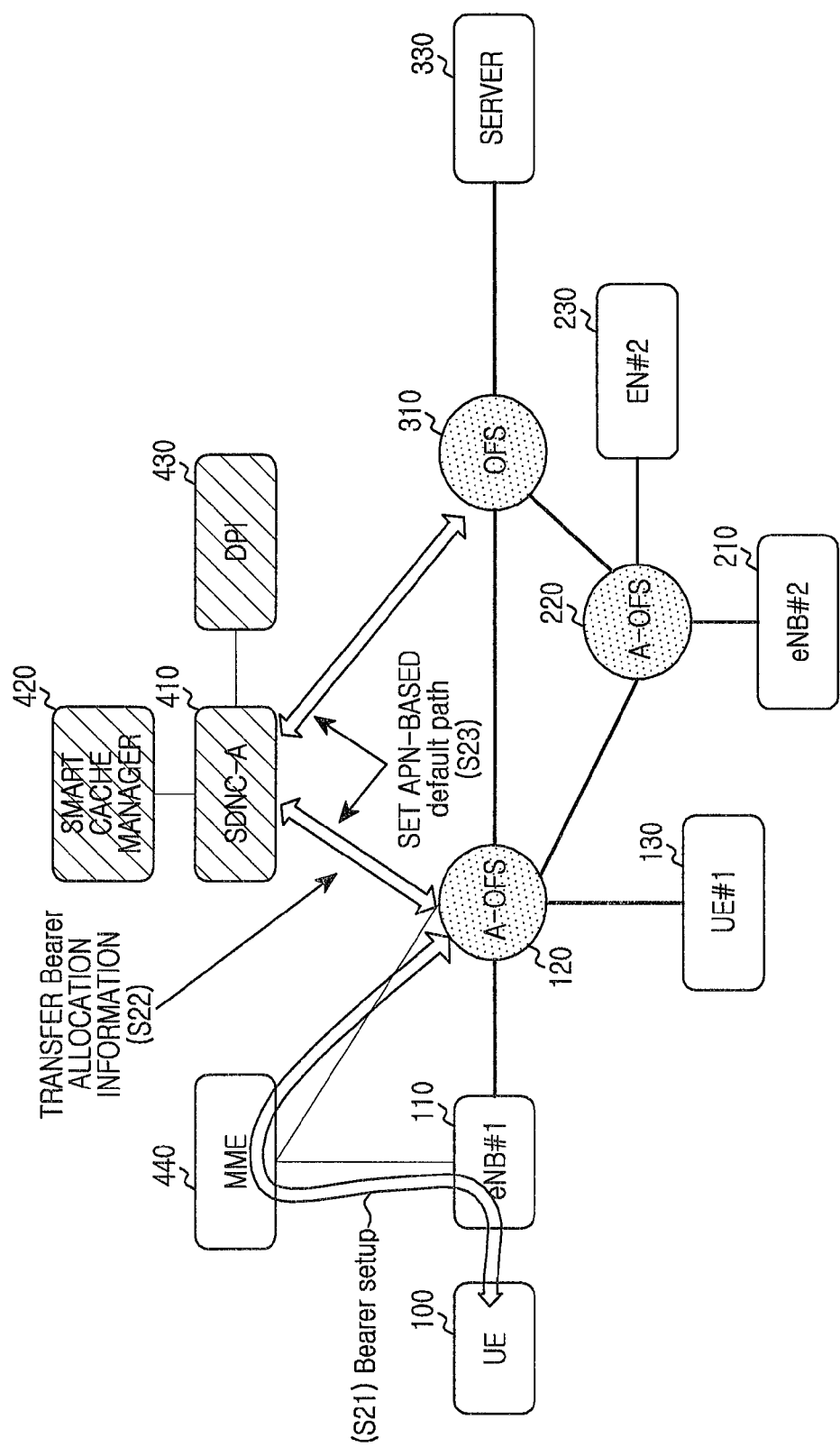
FIG. 2 is a diagram illustrating an example operation of allocating an IP address to a user equipment in an SDN-based mobile communication network according to this disclosure.

FIG. 2 is a diagram illustrating an example operation of allocating an IP address to a UE after the UE is initially accessed in an SDN-based mobile communication network according to this disclosure. A configuration shown in FIG. 2 is only an illustration, and other exemplary embodiments can be used without deviating from the scope of this disclosure.

When the UE 100 is initially accessed, a bearer setup procedure can be performed according to a LTE standard. In an embodiment, the A-OFSs 120 and 220 can perform a function of the EPC and thus a bearer can be set between the UE 100 and the A-OFS 120, and a UE IP can be acquired through the MME 440, and an IP address of the UE 100 can be allocated (S21).

The A-OFS 120 can notify the SDNC 410 of bearer allocation information (such as Tunneling Endpoint Identifier (TEID), International Mobile Subscriber Identity (IMSI)) together with the allocated IP address of the UE (S22).

Thereafter, in order to route UE traffic based on the notified bearer allocation information, the SDNC 410 can set a path of OpenFlow switches including the OFS (S23).

Figure 3:
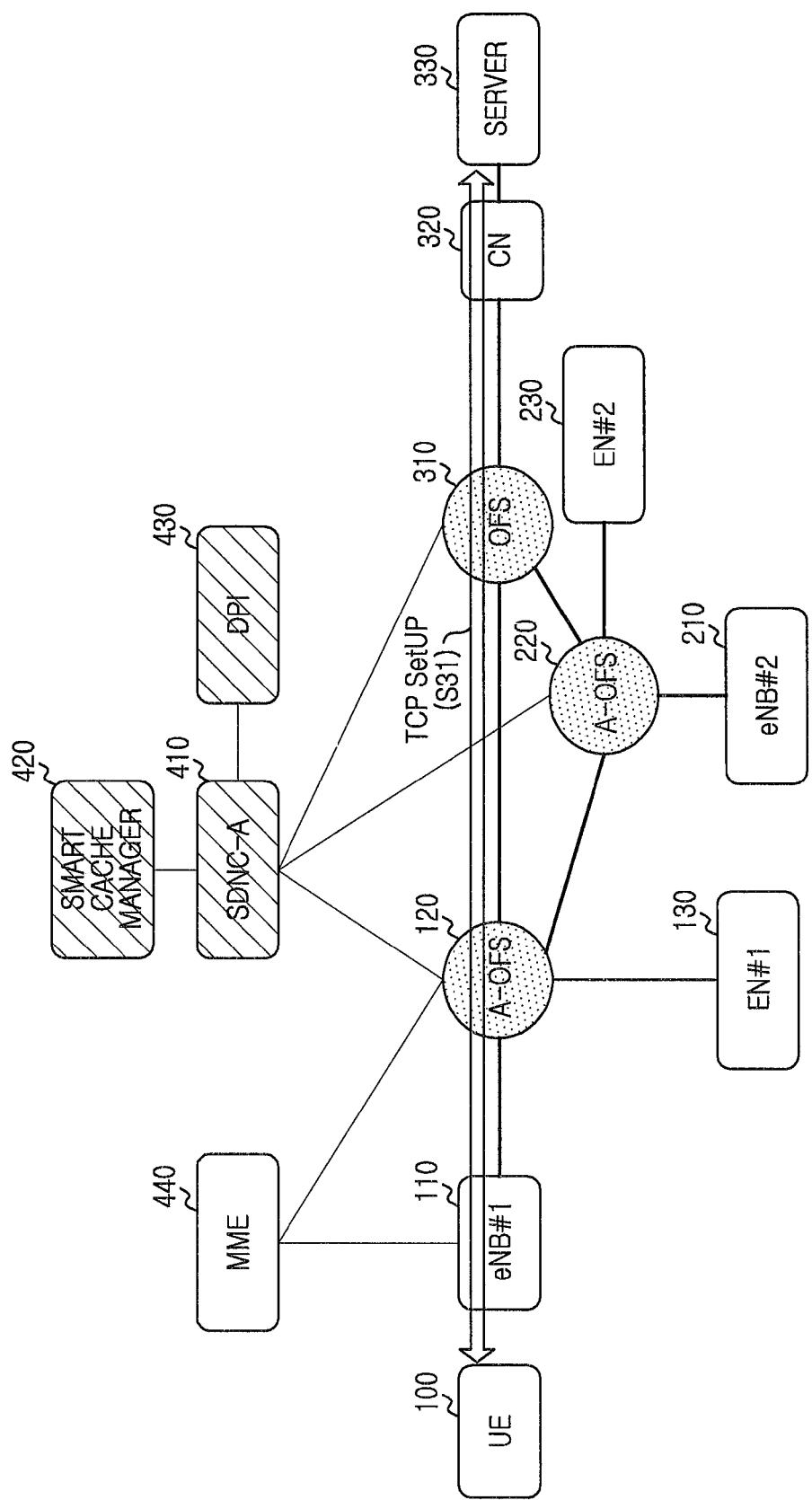
FIG. 3 is a diagram illustrating an example operation of setting a TCP connection in an SDN-based mobile communication network according to this disclosure.

FIG. 3 is a diagram illustrating an example operation of setting a TCP connection before a UE transfers an HTTP request message in an SDN-based mobile communication network according to this disclosure. A configuration shown in FIG. 3 is only an illustration, and other exemplary embodiments can be used without deviating from the scope of this disclosure.

A TCP connection of the UE 100 can be set to an origin server 330, and in this process, the OFSs 120 and 310 can operate similar to a general switch (S31). Further, the A-OFS 120 can perform GTP termination and can transmit a UE packet according to a preset path at a previous operation.

Figure 4:
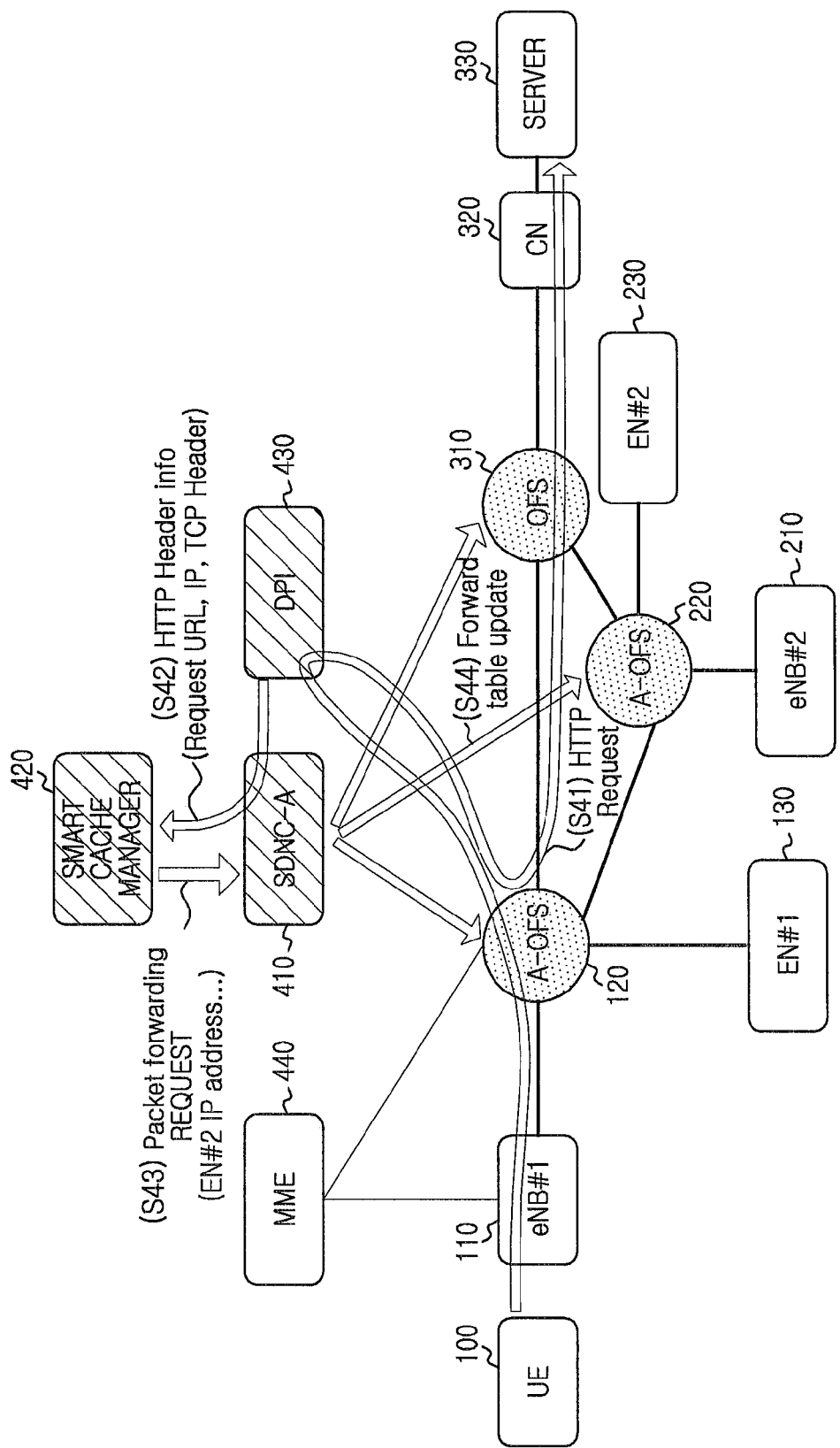
FIG. 4 is a diagram illustrating an example operation of processing a first HTTP GET request message in an SDN-based mobile communication network according to this disclosure.

FIG. 4 is a diagram illustrating an example of an operation of processing a first HTTP GET request message in an SDN-based mobile communication network according to this disclosure. This example illustrates a case in which buffering of a packet is not performed. A configuration shown in FIG. 4 is only an illustration, and other exemplary embodiments can be used without deviating from the scope of this disclosure.

The A-OFS 120 can receive an HTTP GET request packet of the UE 100, can recognize the HTTP GET request packet as a new packet, can send the HTTP GET request packet to the DPI 430, and can enables the DPI 430 to analyze the HTTP GET request packet (S41). In this case, the A-OFS 120 can transmit a packet transmitted by the UE 100 to the DPI 430 or can transmit only header information. The A-OFS 120 can transmit only header information to the DPI 430 and can transmit a packet transmitted by the UE 100 to the DPI 430 through a preset path. FIG. 4 illustrates an example case of transmitting a portion in which analysis is necessary to the DPI 430 instead of buffering a packet of a UE and transmitting the UE packet through a preset path.

When the HTTP GET request packet is transmitted through tunneling, the A-OFS 120 can decapsulate a tunneling packet. Specifically, by decapsulating the tunneling packet, the A-OFS 120 can extract the HTTP GET request packet and can transmit the extracted HTTP GET request packet or header information to the DPI 430. The A-OFS 120 can encapsulate a tunneling packet. Specifically, by encapsulating the HTTP GET request packet, the A-OFS 120 can generate a tunneling packet and can transmit the tunneling packet through the preset path. For example, the tunneling packet can be a GTP packet.

The DPI 430 can analyze HTTP header information included in an HTTP request message based on received information. The DPI 430 can extract an URL, an IP address, and TCP information from the analyzed header information and can transmit the URL, the IP address, and the TCP information to the smart cache manager 420 (S42).

The smart cache manager 420 can determine a location at which a content corresponding to the URL transmitted by the DPI 430 is stored. When a content corresponding to an URL included in a HTTP GET request message in which the UE transmits is stored at the EN #2 230 of the adjacent eNB 210 instead of being stored at the EN #1 130 of the eNB 110 to which the UE is presently accessed, by interworking with the smart cache manager 420, the SDNC 410 can set a forward path of the OpenFlow switch so as to transfer a UE packet via the EN #2 230. That is, when a content in which the UE requests is stored at the EN #2 230 of the adjacent eNB 210, the smart cache manager 420 can transfer a packet forwarding request to the SDNC 410 (S43). In this case, the packet forwarding request can include an IP address of the EN #2 230.

When a packet forwarding request is received from the smart cache manager 420, the SDNC 410 can set a forward path of the OpenFlow switch so as to transfer the UE packet via the EN #2 230 and can update a forward table related thereto (S44).

Figure 5:
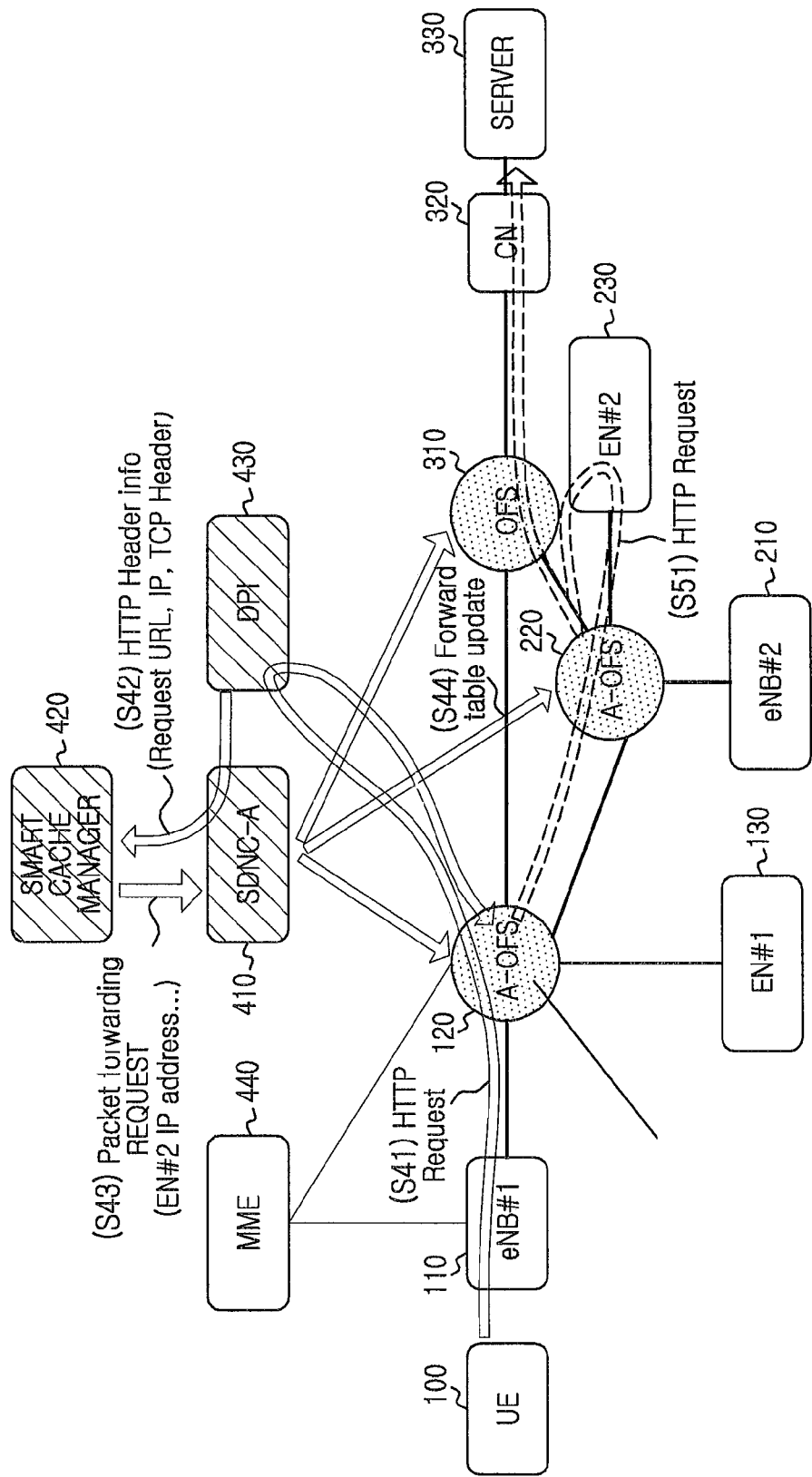
FIG. 5 is a diagram illustrating an example operation of processing a first HTTP GET request message in an SDN-based mobile communication network according to this disclosure.

FIG. 5 is a diagram illustrating an example of an operation of processing a first HTTP GET request message in an SDN-based mobile communication network according to this disclosure. This example illustrates a case of buffering a packet. A configuration shown in FIG. 5 is only an illustration, and other exemplary embodiments can be used without deviating from the scope of this disclosure.

FIG. 5 illustrates a case in which the A-OFS 120 buffers a request message from the UE until the DPI 430 analyzes a first HTTP request packet and the smart cache manager 420 transfers a forward path setup instruction to the SDNC 410. In this case, buffering can be performed similar to a description of FIG. 4, but because the A-OFS 120 buffers a request message, the request message can be transferred to the server 330 via the EN #2 230 through a preset path (S51).

Figure 6:
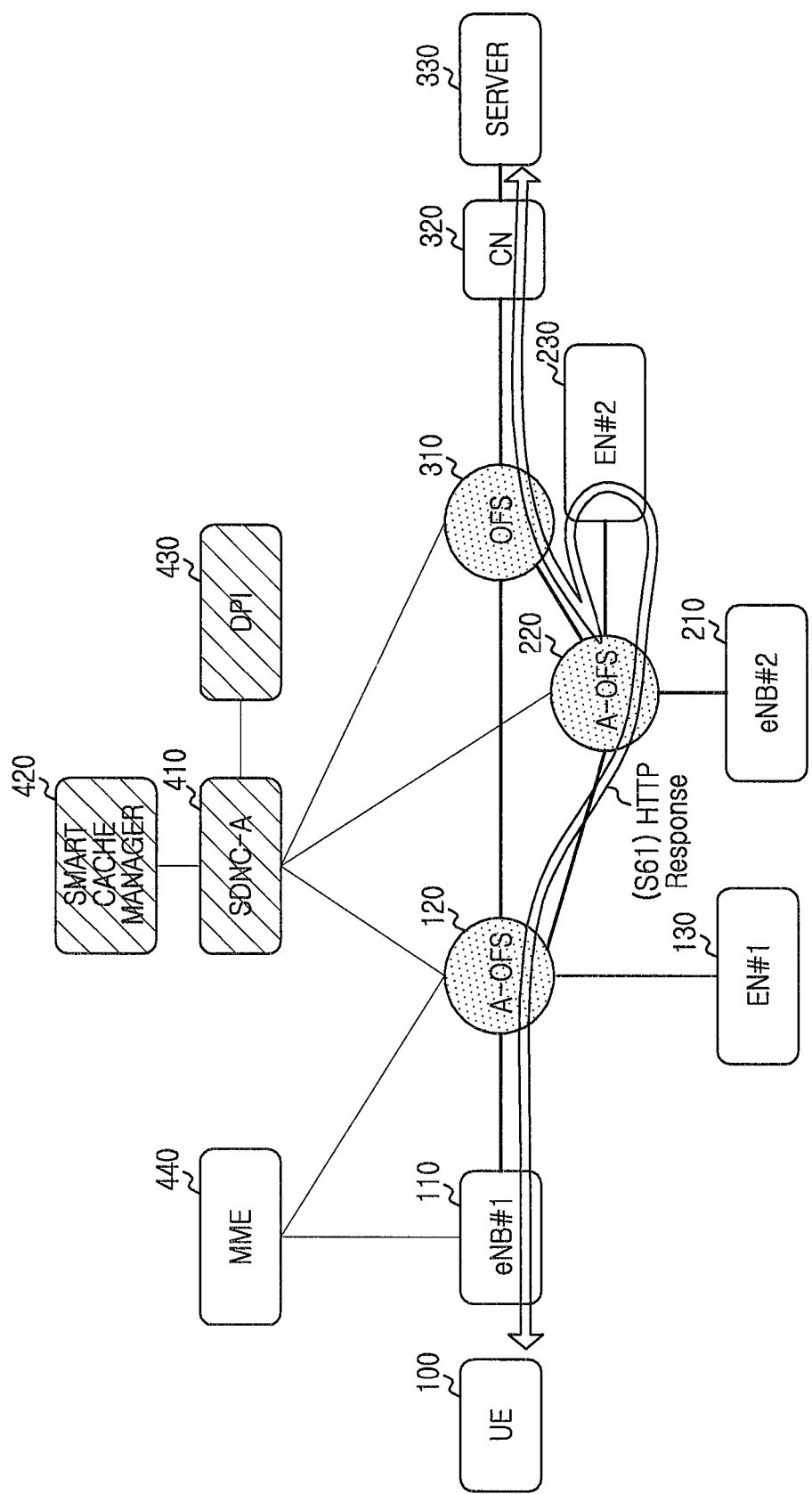
FIG. 6 is a diagram illustrating an example operation of processing a response message to a first HTTP GET request message in an SDN-based mobile communication network according to this disclosure.

FIG. 6 is a diagram illustrating an example operation of processing a response message to a first HTTP GET request message in an SDN-based mobile communication network according to this disclosure. A configuration shown in FIG. 6 is only an illustration, and other exemplary embodiments can be used without deviating from the scope of this disclosure.

An HTTP response message can be transferred to the UE 100 via the EN #2 230 in a response to a HTTP GET request message through a preset path (S61).

Figure 7:
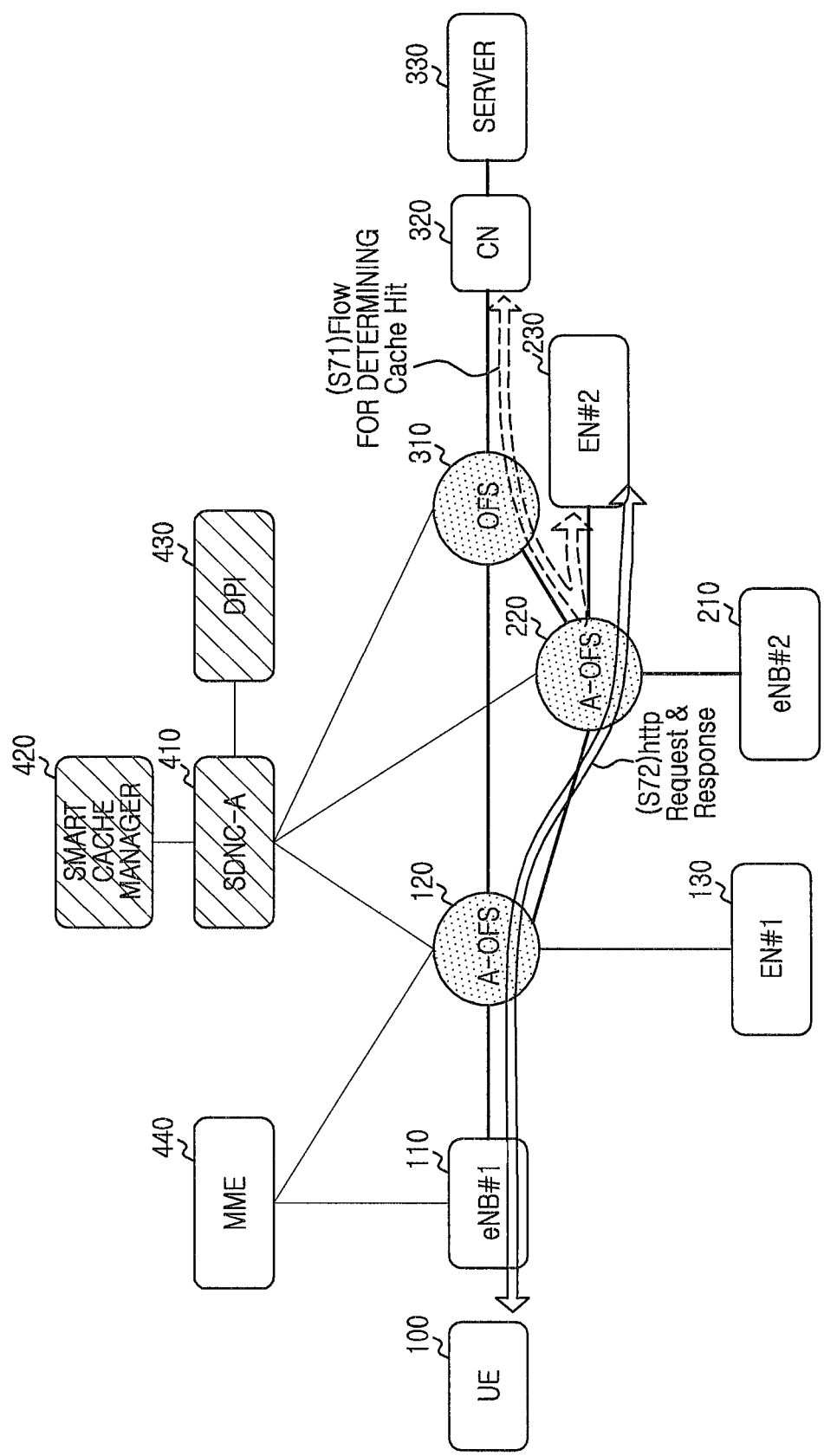
FIG. 7 is a diagram illustrating an example operation of transferring an HTTP packet after a cache hit in an SDN-based mobile communication network according to this disclosure.

FIG. 7 is a diagram illustrating an example operation of transferring an HTTP packet after a cache hit in an SDN-based mobile communication network according to this disclosure. A configuration shown in FIG. 7 is only an illustration, and other exemplary embodiments can be used without deviating from the scope of this disclosure.

Referring to FIG. 7, because a corresponding content in which the UE requests is stored at the EN #2 230, and a cache hit is performed and thus the EN #2 230 can operate as a direct content providing server.

The EN #2 230 can notify the CN 320 of a cache hit and can enable the CN 320 to disconnect a connection to the server 330 (S71).

The EN #2 230 can generate a TCP state for operating as a TCP source using TCP state information in which the CN 320 has transmitted and can directly transmit a requested content to the UE 100 (S72). After a cache hit, operation of the EN and the CN follows operation can be defined in a smart cache system.

Figure 8:
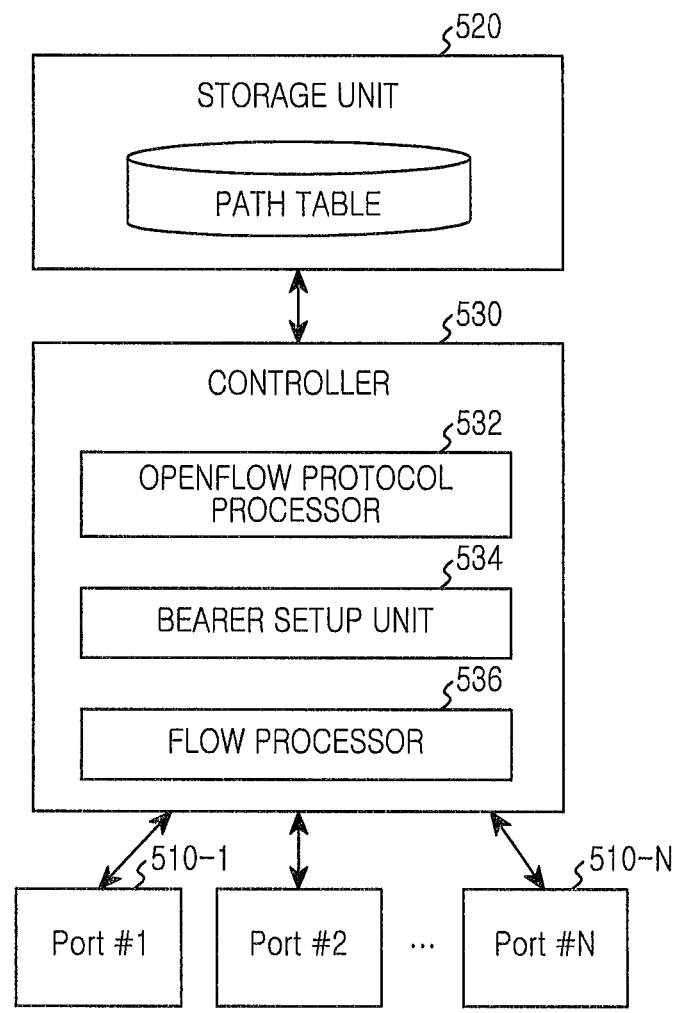
FIG. 8 is a block diagram illustrating an example configuration of an OpenFlow switch in a mobile communication network according to this disclosure.

FIG. 8 is a block diagram illustrating an example configuration of an OpenFlow switch in a communication network according to this disclosure. A configuration shown in FIG. 8 is only an illustration, and other exemplary embodiments can be used without deviating from the scope of this disclosure.

Referring to FIG. 8, the OpenFlow switch can include a plurality of ports 510-1 to 510-N, a storage unit 520, and a control unit 530.

The plurality of ports 510-1 to 510-N can be connection points of lines for forming a backhaul network. Each of the plurality of ports 510-1 to 510-N can be connected to an eNB.

The storage unit 520 can store a basic program and can setup information necessary for operation of the OpenFlow switch. Particularly, the storage unit 520 can store path information determined according to information notified from the SDNC. The storage unit 520 can update data and can provide stored data according to the control of the control unit 530.

The control unit 530 can control general operations of the OpenFlow switch. Particularly, the control unit 530 can include an OpenFlow protocol processor 532 that can control to operate as an agent of an OpenFlow protocol, a bearer setup unit 534 that can perform a bearer setup procedure of a UE, and a flow processor 536 that processes flow of UEs. For path setup and traffic transfer, the control unit 530 can control the OpenFlow switch to operate like the A-OFSs 120 and 220 shown in FIGS. 1 to 7.

Figure 9:
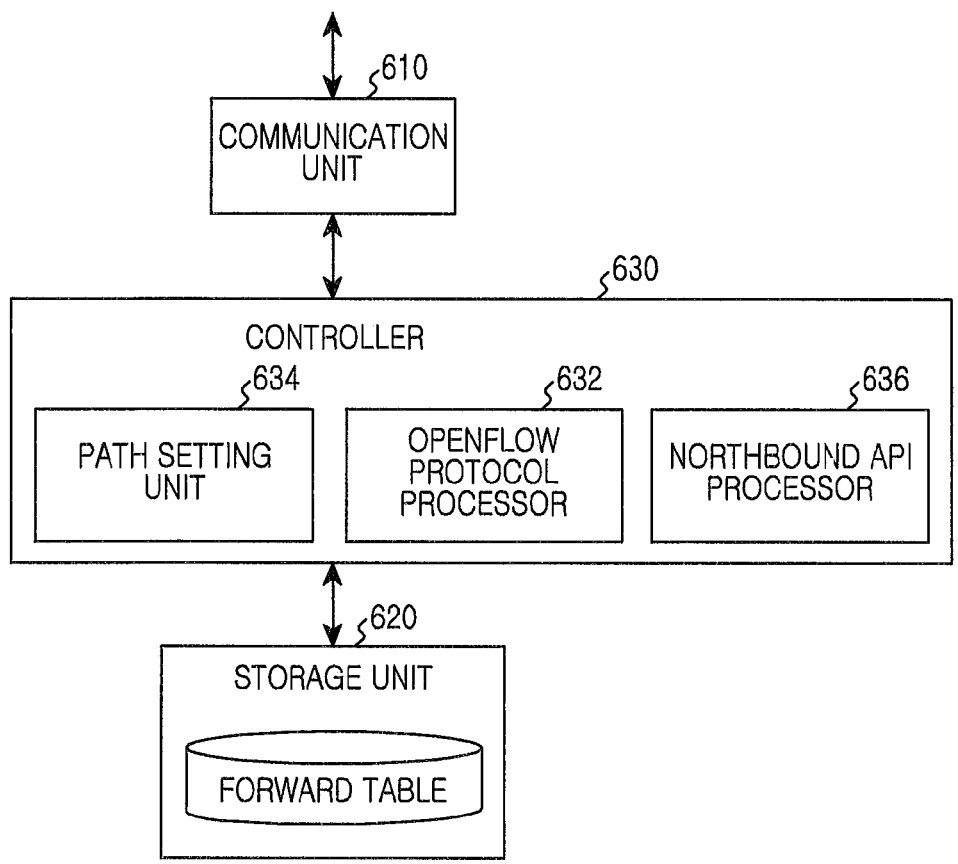
FIG. 9 is a block diagram illustrating an example configuration of an SDN controller (SDNC) in a mobile communication network according to this disclosure.

FIG. 9 is a block diagram illustrating an example configuration of an SDNC in a mobile communication network according to this disclosure. A configuration shown in FIG. 9 is only an illustration, and other exemplary embodiments can be used without deviating from the scope of this disclosure.

Referring to FIG. 9, the SDNC can include a communication unit 610, a storage unit 620, and a control unit 630.

The communication unit 610 can provide an interface for transmitting and receiving information to and from another entity through a network. The communication unit 610 can be referred to as a network card, an Ethernet card, an Ethernet adaptor, and a Network Interface Card (NIC). The communication unit 610 can transmit and receive a signal, as described herein. Accordingly, the communication unit 610 can be referred to as a transmitting unit, a receiving unit, or a transmitting and receiving unit.

The storage unit 620 can store data such as a basic program, an application program, and setup information for operation of the SDNC. Particularly, the storage unit 620 can store a forward table including path information of Open-Flow agents. The storage unit 620 can update data and can provide stored data according to the control of the control unit 630.

The control unit 630 can control general operation of the network entity. For example, the control unit 630 can transmit and receive a signal through the communication unit 610. In an embodiment, the control unit 630 can includes an OpenFlow protocol processor 632 that controls to operate as a controller according to an OpenFlow protocol, a path setup unit 634 that can set a path of OpenFlow agents, and a northbound API processor 636 that can receive information necessary for path setup. The control unit 630 can acquire information necessary for setup through the northbound API processor 636.

For path setup and traffic transfer, the control unit 630 can control to operate the SDNC like the SDNC 410 shown in FIGS. 1 to 7.

The foregoing exemplary embodiments can have the following effect, compared with an existing smart cache system. When a UE requests contents that are not stored at an EN as an access cache interworked with an eNB, the existing smart cache system should receive the contents from a server via a core network and thus backhaul should be used, and a response time can be extended and thus User eXperience (UX) can decrease. However, in an embodiment, by grasping contents stored at an EN of an adjacent eNB, when a corresponding content exists at the adjacent eNB, by enabling to transmit the content from the EN of the adjacent eNB to the UE, a backhaul use amount can be reduced, and by transmitting the content at a more near location, UX of the UE can be improved.

Furthermore, by enabling adjacent ENs to operate in a pooling form, a limited storage capacity can be shared and thus the storage capacity can be efficiently stored and used. Therefore, a storage capacity to storage of each EN can be increased.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been particularly shown and described with reference to exemplary embodiments thereof, it will be understood by those skilled in the art that various changes in form and details may be made therein without departing from the spirit and scope of this disclosure as defined by the appended claims.

What is claimed is:

1. A method for operating a switch connected to a controller in a software-defined network (SDN) based mobile communication network, the method comprising:
    performing, through a mobility management entity (MME), bearer setup with a user equipment (UE) accessed to a based station (BS), the BS connected to a first access cache not storing contents;
    transmitting, to the controller, information for the bearer setup and an UE internet protocol (IP) address allocated by the MME;
    receiving, from the UE, a packet for requesting contents;
    transmitting, to a deep packet inspection (DPI) connected to the controller, header information that is generated based on the packet;
    receiving, from the controller, a message for setting a path between the UE and a second access cache connected to a neighboring BS, the second access cache storing the contents; and
    providing, to the UE, the contents transmitted from the second access cache.

2. The method of claim 1, further comprising:
    performing general packet radios system tunneling packet (GTP) termination; and
    receiving, from the UE, from the packet based on the GTP termination.

3. The method of claim 1, wherein the header information comprises a uniform resource location (URL) of the contents.

4. The method of claim 1, wherein the header information is generated by decapsulating the packet.

5. The method of claim 1, wherein the packet is a hyper text transfer protocol (HTTP) GET request packet.

6. A method for operating a controller in a software-defined network (SDN) based mobile communication network, the method comprising:
    receiving, from a switch, information for bearer setup between the switch and an user equipment (UE) and an UE internet protocol (IP) address allocated by a mobility management entity (MME), wherein the UE is accessed to the BS and the BS is connected to a first access cache not storing contents;
    receiving, from a smart cache manager, a first message for notifying that a second access cache connected to a neighboring BS stores contents, wherein the contents is requested from the UE; and
    transmitting, to the switch, a second message for setting a path between the UE and the second access cache,
    wherein the first message is generated, by the controller, based on the information for the bearer setup and the UE IP address, and
    wherein the contents is provided to the UE from the second access cache.

7. The method of claim 6, wherein the first message is generated based on a third message for notifying that the contents is preloaded contents, and wherein the third message is transmitted, to the smart cache manager, from a deep packet inspection (DPI).

8. The method of claim 7, wherein the third message is determined based on header information regarding a packet for requesting the contents, and wherein the header information is transmitted, from the switch, in response to receiving the packet.

9. The method of claim 8, wherein the header information comprises a uniform resource location (URL) of the contents, and wherein the third message is determined based on the URL.

10. The method of claim 8, wherein the header information is generated by decapsulating the packet.

11. An apparatus of a switch connected to a controller in a software-defined network (SDN) based mobile communication network, the apparatus comprising:
a sub-controller configured to:
perform, through a mobility management entity (MME), bearer setup with a user equipment (UE) accessed to a base station (BS), the BS connected to a first access cache not storing contents;
transmit, to the controller, information for the bearer setup and an UE internet protocol (IP) address allocated by the MME;
receive, from the UE, a packet for requesting contents;
transmit, to a deep packet inspection (DPI) connected to the controller, header information that is generated based on the packet;
receive, from the controller, a message for setting a path between the UE and a second access cache connected to a neighboring BS, the second access cache storing the contents; and
provide, to the UE, the contents transmitted from the second access cache.

12. The apparatus of claim 11, wherein the sub-controller is further configured to:
perform GTP(general packet radios system tunneling packet) termination; and
receive, from the UE, from the packet based on the GTP termination.

13. The apparatus of claim 11, wherein the header information comprises a uniform resource location (URL) of the contents.

14. The apparatus of claim 11, wherein the header information is generated by decapsulating the packet.

15. The apparatus of claim 11, wherein the packet is a hyper text transfer protocol (HTTP) GET request packet.

16. An apparatus of a controller in a software-defined network (SDN) based a mobile communication network, the apparatus comprising:
a sub-controller; and
a communication interface operatively coupled to the sub-controller,
wherein the sub-controller is configured to:
receive, from a switch, information for bearer setup between the switch and an user equipment (UE) and an UE internet protocol (IP) address allocated by a mobility management entity (MME), wherein the UE is accessed to the BS and the BS is connected to a first access cache not storing contents;
receive, from a smart cache manager, a first message for notifying that a second access cache connected to a neighboring BS stores contents, wherein the contents is required from the UE; and
transmit, to the switch, a second message for setting a path between the UE and the second access cache, wherein the first message is generated, by the controller, based on the information for the bearer setup and the UE IP address, and wherein the contents is provided to the UE from the second access cache.

17. The apparatus of claim 16, wherein the first message is generated based on a third message for notifying that the contents is preloaded contents, wherein the third message is transmitted, to the smart cache manager, from a deep packet inspection (DPI).

18. The apparatus of claim 17, wherein thee third message is determined based on header information regarding a packet for requesting the contents, wherein the header information is transmitted, from the switch, in response to receiving the packet.

19. The apparatus of claim 18, wherein the header information comprises a uniform resource location (URL) of the contents, and wherein the third message is determined based on the URL.

20. The apparatus of claim 18, wherein the header information is generated by decapsulating the packet.

* * * * *